INVENTORS
WALTER C. KILIUS.
JOHN F. RUDOLPH.
BY A.B. Bowman
ATTORNEY

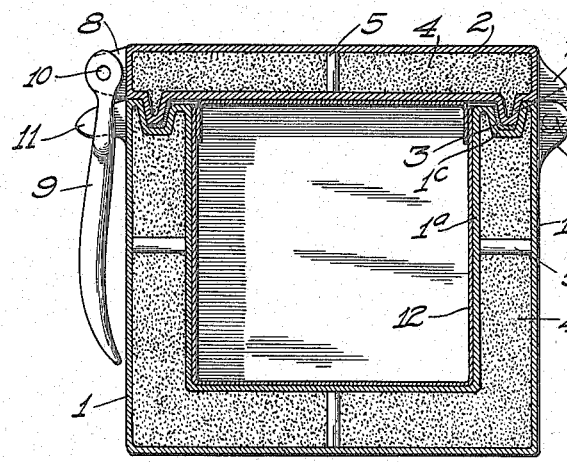
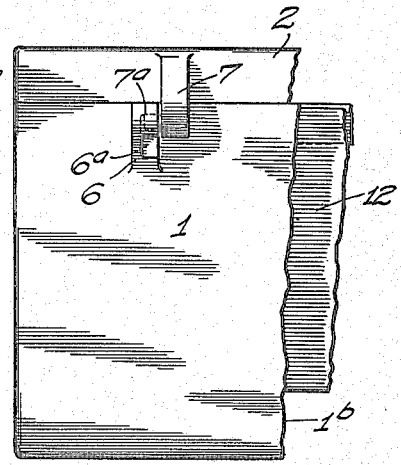
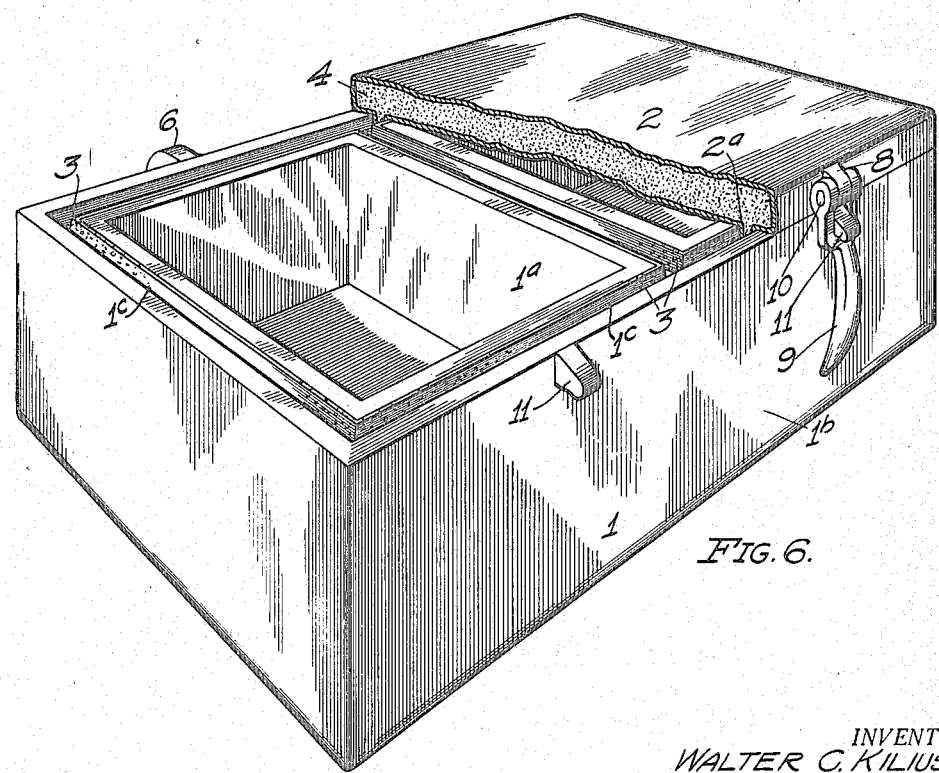

Patented Aug. 12, 1924.

1,504,353

UNITED STATES PATENT OFFICE.

WALTER C. KILIUS AND JOHN F. RUDOLPH, OF LOMPOC, CALIFORNIA; SAID RUDOLPH ASSIGNOR TO SAID KILIUS.

THERMOCONTAINER.

Application filed October 4, 1922. Serial No. 592,350.

*To all whom it may concern:*

Be it known that we, WALTER C. KILIUS and JOHN F. RUDOLPH, citizens of the United States, residing at Lompoc, in the county of Santa Barbara and State of California, have invented a certain new and useful Improvement in Thermocontainers, of which the following is a specification.

Our invention relates to heat retaining and heat resisting containers, particularly to containers of this class for commercially transporting hot or cold products and the objects of our invention are: first, to provide a container of this class which will keep products cool or frozen for long periods without the use of ice or other cooling agents; second, to provide compact rectangularly shaped containers of this class which can be easily stacked and conveniently transported from one place to another; third, to provide a container of this class which will prevent warm or hot products from cooling quickly; fourth, to provide a sanitary liner for containers of this class; fifth, to provide novel means for positioning and securing the cover to the container member; sixth, to provide a novelly constructed container of this class and seventh, to provide a container of this class which is very simple and economical of construction, durable, efficient, practical and which will not readily deteriorate or get out of order.

Figure 1:
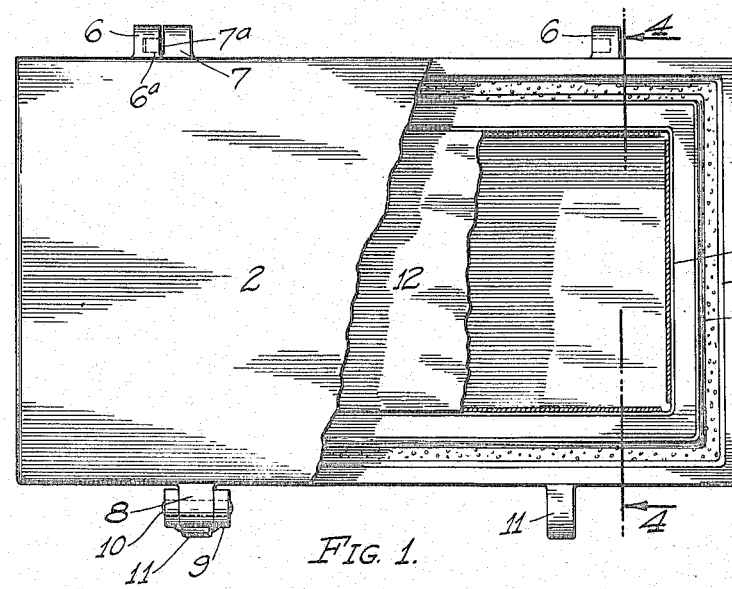
Figure 2:
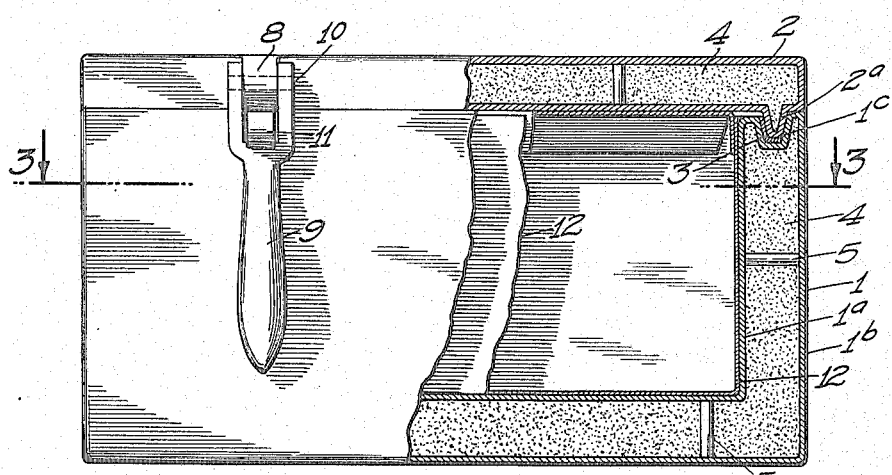
Figure 3:
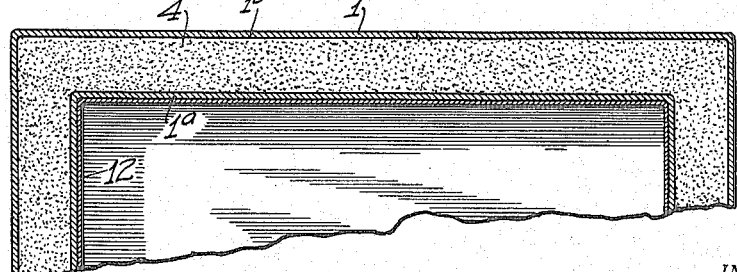

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a plan view of our container with the cover and sanitary liner partly broken away to facilitate the illustration; Fig. 2 is a front elevational view thereof also showing certain parts and portions broken away and in section to facilitate the illustration; Fig. 3 is a fragmentary horizontal sectional view thereof taken through 3—3 of Fig. 2; Fig. 4 is a transverse sectional view taken through 4—4 of Fig. 1; Fig. 5 is a rear elevational view thereof and Fig. 6 is a perspective view of a slightly modified form of construction showing several compartments and showing the cover thereof partly broken away and in section to more clearly illustrate the construction.

Like characters of reference refer to similar parts and portions throughout the several views of the drawings.

The container member 1, cover member 2, gasket 3, insulating material 4, spacing members 5, lugs 6, 7, and 8, latch handles 9, pins 10, lugs 11 and the sanitary liner 12 constitute the principal parts and portions of our container structure in its preferred form.

The container member 1 is made up of the inner and outer container portions $1^a$ and $1^b$ respectively, making a container with double-walled sides and bottom. Said container member 1 is provided with a channel $1^c$ at its upper edge intermediate its inner and outer walls and extending around the upper edge of the side walls, the side walls of said channel diverging outwardly. The cover member 2 is also made up of a double wall structure with a space between said wall portions. Said cover member 2 is provided at its under side with a hollow flange portion $2^a$ corresponding to the channel portion of the container member, the side walls thereof converging downwardly and is adapted to position the cover member on the container member. A gasket 3, preferably made of cork is interposed between the channel portion of the container 1 and the flange portion of the cover member 2 to reduce or increase the loss or gain of heat by radiation or conduction from or to the inner chamber of the container 1 to a minimum. An insulating material 4 which consists of a dehydrated form a diatomaceous material sometimes known as diatomaceous earth consisting of microscopic forms of diatoms or hollow cells, is provided and packed between the inner and outer wall portions of both the container and cover members 1 and 2 respectively. Said insulating material 4 supports the walls of the members 1 and 2 relatively to each other. We have also provided spacer members 5 which are preferably made of some non-heat conducting material and are secured to the wall portions of the members 1 and 2 in any convenient manner, to further space and support the wall portions of said members relatively to each other. Secured to the upper portion of the back wall of the container member 1 are the lugs 6, spaced from the ends, and are provided with slots 6ª extending therein from the inside and bottom portions thereof and are adapted to receive corresponding lugs 7ª which extend outwardly from the lugs 7 parallel with the rear wall of said container member and which lugs 7 are secured to the rear portion of the cover member 2. Other lugs 8 are provided on the front face of the cover member 2 on which are pivotally mounted the latch handles 9 by means of the pins 10. Said latch handle 9 is bifurcated at its upper portion and is adapted to engage at the lower end of its bifurcated portion the lower side of the lug 11 which is secured to the upper portion of the front face of the container member 1. It will be noted that the cover member 2 may be easily removed from the container member by withdrawing the latch handle 9 from engagement with the lugs 11, lifting the cover member 2 at the front portion above its rear edge and permitting the lug portions 7ª to slip downwardly clear of the slots 6ª of the lugs 6. Said cover member may be easily replaced in a similar manner. We have provided a sanitary liner 12 on the inside of the container member 1, which liner is preferably made of a waxed paper and may be easily removed when soiled and replaced by another liner.

In the slightly modified form of construction as shown in Fig. 6 of the drawings we have provided a similar container but on a larger commercial scale with several separated compartments in which several different products may be easily packed and transported, especially when transporting products of different temperatures, odors, consistencies or the like.

Though we have shown and described a particular construction, combination and arrangement of parts and portions and a certain modification thereof we do not wish to be limited to this particular construction, combination and arrangement nor to the certain modification but desire to include in the scope of our invention the construction, combination and arrangement substantially as set forth in the appended claims.

Having thus described our invention what we claim as new and desire to secure by Letters Patent, is:

1. A container of the class described, including a double-walled container member, a quickly removable double-walled cover member, a heat insulating material interposed between the wall portions of said container and cover members, interlocking lugs provided on one side of said container and cover members to permit ready disconnection of said members from each other and cover contracting latch members provided on the other side of said container and cover members.

2. A container of the class described, including a container member having double-walled sides and bottom and provided with a channel at its upper edge extending around the same, said channel having upwardly diverging side walls, a double-walled cover provided with a downwardly extending hollow flange portion with downwardly converging side walls, said flange corresponding to and positioned opposite the channel of said container member, a heat insulating gasket positioned within said channel against the bottom and inside side walls thereof, and a diatomaceous heat insulating material provided between the walls of the double-walled portions of the container and cover members.

3. A container of the class described, including a container member having double-walled sides and bottom and provided with a channel at its upper edge extending around the same, said channel having upwardly diverging side walls, a double-walled cover member provided with a downwardly extending hollow flange portion with downwardly converging side walls, said flange corresponding to and positioned opposite the channel of said container member, a diatomaceous heat insulating material provided between the walls of the double-walled portions of said container and cover members, a heat insulating gasket provided in the channel of said container member and positioned against the bottom and side walls thereof and engageable by the flange of the cover member and a sanitary paper liner provided in the inner compartment of said container.

4. A container of the class described, including a container member having double-walled sides and bottom and provided with a channel at its upper edge extending around all sides thereof, a double-walled cover member provided with an outwardly extending flange portion on one side thereof corresponding to and positioned opposite to the channel of said container member, the inner and outer walls of said container and cover members being constructed of thin sheet metal, heat insulating, reinforcing and spacing members positioned between and secured to the inner and outer wall members of said container and cover members, and a diatomaceous heat insulating material provided between the walls of the double-walled portions of said container and cover members.

In testimony whereof, we have hereunto set our hands at Lompoc, California, this 22 day of September, 1922.

WALTER C. KILIUS.
JOHN F. RUDOLPH.